R. W. THOMPSON.
COMPOUND RAILROAD RAIL.
No. 181,878.  Patented Sept. 5, 1876.
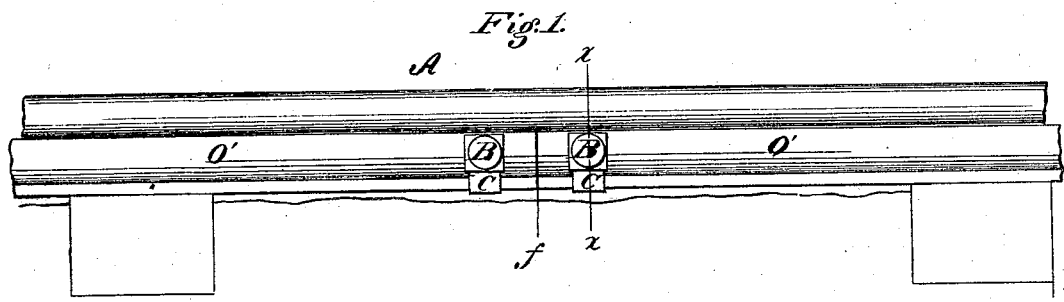
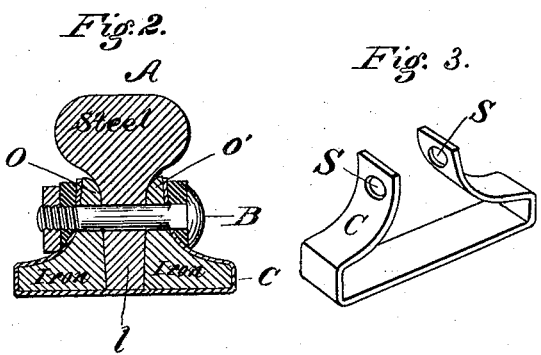
Witnesses:
Donn P Turtchill
Will H Dodge
Inventor:
R. W. Thompson,
by Dodge & Son
Attys.

UNITED STATES PATENT OFFICE.

ROBERT W. THOMPSON, OF WADSWORTH, OHIO.

IMPROVEMENT IN COMPOUND RAILROAD-RAILS.

Specification forming part of Letters Patent No. 181,878, dated September 5, 1876; application filed April 12, 1876.

*To all whom it may concern:*

Be it known that I, ROBERT W. THOMPSON, of Wadsworth, in the county of Medina and State of Ohio, have invented certain Improvements in Railway-Rails, of which the following is a specification:

My invention consists in a compound rail of novel construction, and a clamp for fastening the parts together, as hereinafter more fully described.

In the drawings, Figure 1 represents a side view of my improved device; Fig. 2, a cross-section on the line $x$ $x$ of Fig. 1; Fig. 3, a perspective view of the safety-clamp.

My invention relates to that class of rails commonly known as "compound rails;" and consists, essentially, of the tread A, and the side pieces or flanges O and O'. The tread A is made of the same form on its upper surface as the ordinary rail; but instead of being widened out, or provided at its lower side with flanges, as usual, the neck or narrow portion $l$ of the rail is carried down the entire distance, as shown in Fig. 2, and the side pieces O and O' are bolted to the tread or central section A, by means of bolts B passing entirely through the three pieces, and thus locking them securely together, as shown. By this arrangement I am enabled to make the tread of steel, and the side pieces or flanges of iron. As there is no wear of any consequence on the side pieces or flanges, it will be observed that when the rails are once set in position and secured, the only thing necessary in order to replace a worn or broken rail is to remove the bolts which pass through it, when the tread or central section may be raised up from between the side pieces and a new one inserted, the side pieces being kept in position by means of spikes, in the usual manner.

It will be notice that by this arrangement the tread may be quickly replaced, the necessity of drawing the spikes is done away with, and the tread is placed in position with perfect accuracy.

In order to facilitate the removal of the tread or central section A the neck $l$ will be made slightly tapering, as shown in Fig. 2.

The flanges or side pieces O O' may be made to extend upward, and terminate in a square shoulder, on which the central section or tread may rest, or they may be allowed to stop short of the enlarged portion of the tread, in which case the tread would rest mainly upon the same support as that upon which the flanges stand.

In practice, it is considered preferable to make the flanges of the form above described — that is, terminating in a square shoulder — at the same time extending the neck $l$ of the tread down until its lower face comes just flush with the lower face of the flanges, thereby causing the tread A to rest both upon the side pieces O O' and upon the sleeper or support which holds the side pieces or flanges. In putting the rail together the central and side pieces are so arranged as to break joints.

This construction is of particular value on bridges and tressel-work, where the supports are much more liable to become loose or be misplaced than on the ordinary road-bed. It is apparent that, as the rails are fastened together in such a manner as to form one continuous piece, the supports might be removed for a considerable space without allowing the rails to sag a sufficient distance to do any material injury, while at the same time it would effectually prevent the end of one rail from dropping below that of the adjoining one, and would form a safe guide for the wheels of a truck passing over it, until the weight upon the rail should become sufficient to sever the metal. This manner of connecting the rails also dispenses with the use of fish-plates, the side pieces or flanges performing the same purpose in connection with their other uses.

The next feature of my invention relates to a safety-clamp, to be used on or in connection with my rail, and is more particularly designed for use on bridges and tressel-work, where, as before stated, the different portions of the rail are more liable to draw away from each other than in other places. As shown in Figs. 2 and 3, this clamp C corresponds in form to the configuration of the sides and lower face of the rail when the parts are put together and the rail made complete.

The parts of the rail being put together and adjusted to their positions with relation to each other, the clamp is slipped on over the end of the rail, and moved along until the holes S, with which it is provided, come opposite to the bolt-holes in the rail, when the bolt is passed through, as shown in Fig. 2, and the nut screwed up to place, locking all the parts firmly together.

It will be seen that when the clamp is used it is impossible for the parts to be separated or moved away from each other, and that they will be retained in position even though the bolt should work out, as so often happens.

When the side pieces are made, as shown in Fig. 2, without the shoulders to support the central section or tread A, the tread is liable to be forced downward, in which event a heavy pressure is brought to bear upon the bolts B; but by using the clamp C the tread A is effectually prevented from thus working down, and the pressure, instead of coming upon the bolts, comes on the clamp.

This construction of the rail, the manner of connecting, and the clamp for securing the rails together, form a very perfect, simple, and ultimately cheap device, having all the advantages of the steel rail, without being so expensive, is quickly and cheaply replaced, and is extremely safe and strong.

Having thus described my invention, what I claim is—

1. A compound railroad-rail, consisting of the two flanged side rails O and O' and the central or tread rail A, having its central rib or neck $l$ of such a depth as to come flush with the bottom of the flanges of the side rails, so as to rest therewith upon the face of the sleeper, and of such a form as to permit said tread-rail to be removed without detaching or disturbing the side rails, as set forth.

2. In combination with the compound rail, the clamp C, applied thereto, and secured by the bolt B, substantially as herein set forth.

R. W. THOMPSON.

Witnesses:
W. C. DODGE,
WILL W. DODGE.